Nov. 8, 1955 A. GRANT 2,722,734
RECONSTRUCTION OF CHEMICAL EQUIPMENT
Original Filed July 20, 1944 2 Sheets-Sheet 1
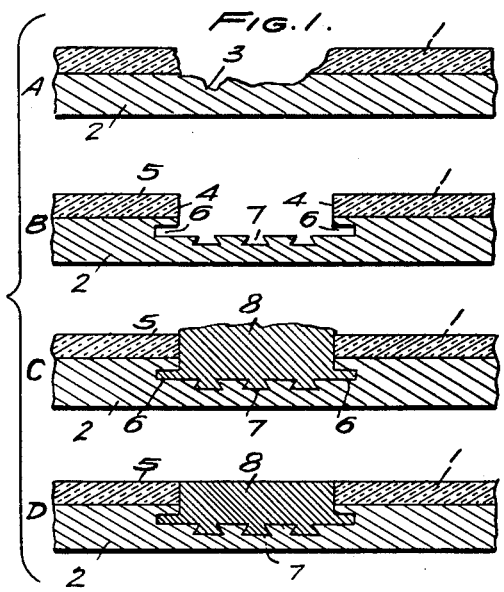
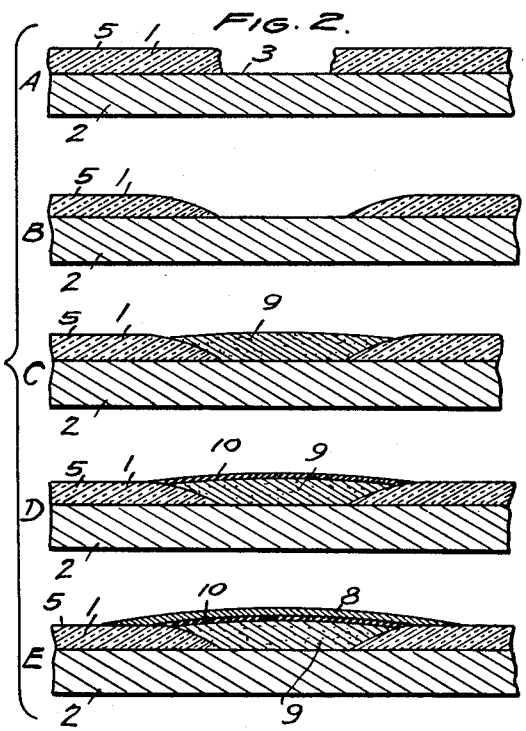
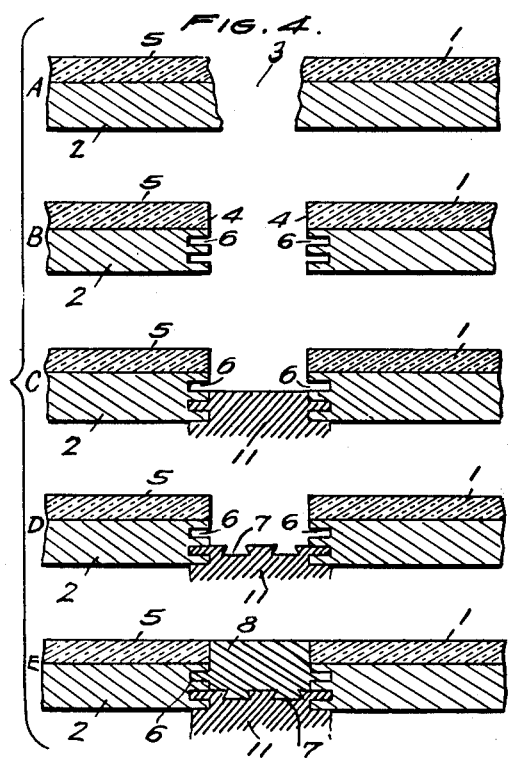
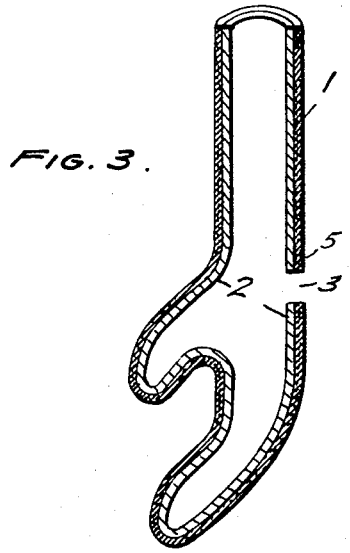
INVENTOR
ALVIN GRANT
BY Fred S. Lockwood
and Henry Berk
ATTORNEYS

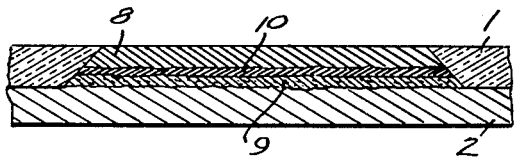
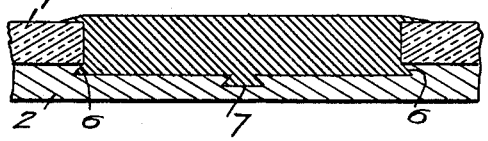
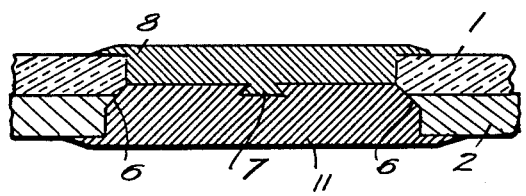
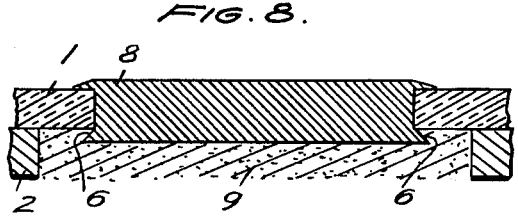
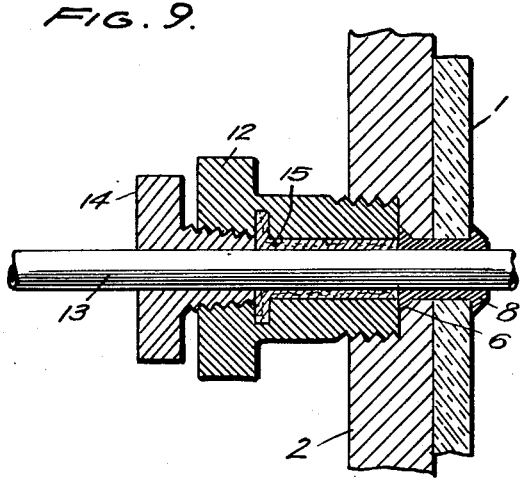

United States Patent Office 2,722,734
Patented Nov. 8, 1955

2,722,734

RECONSTRUCTION OF CHEMICAL EQUIPMENT

Alvin Grant, Denver, Colo.

Original application July 20, 1944, Serial No. 545,820. Divided and this application June 7, 1951, Serial No. 236,435

1 Claim. (Cl. 29—401)

(Granted under Title 35, U. S. Code (1952), sec. 266)

The invention described herein may be manufactured and used by or for the Government for governmental purposes without the payment of any royalty thereon to me.

This invention relates particularly to a procedure for repairing glass (vitreous enamel or porcelain) lined reactors used extensively in the chemical industry.

This application is a division of my original application for patent, Serial No. 545,820, same title, filed in the U. S. Patent Office July 20, 1944, now abandoned.

Glass-lined equipment, constructed generally of a sheet steel, forged steel, or cast iron metal base with a fused silicate coating, has become a necessity for chemical treatments and storage of substances which are highly corrosive to common metals and which tend to be contaminated in contact with such metals, but glass-lined equipment unfortunately is susceptible to damage on account of the fragility of the coating.

Hitherto, no satisfactory method has been available for patching damaged areas larger than a pin hole in a glass lining, especially when the duty of the equipment is severe. For holes larger than pin holes, ceramic patches have been used, but such patches have been generally unsatisfactory and act as a temporary palliative rather than as a remedy. Ceramic patches are rapidly eroded and dissolved in contct with corrosive chemicals. They have to be inspected and replaced frequently. When the break in the enamel has been larger than two inches, it has been considered advisable to return the damaged equipment to the manufacturer for repairs requiring removal of the enamel lining and reenameling in a manner similar to that originally used, and when the metal beneath the enamel had become substantially corroded the equipment was discarded.

An object of this invention is to provide a technique for mending the glass-lined equipment to correct the conditions set forth so as to keep the equipment in service, with a saving in cost, increased safety to personnel, and a decrease in lost time.

The new procedure now developed for mending glass lined equipment, generally and briefly involves preparing the damaged areas by removal of frail margins and dirt, forming the damaged area into a cavity extending through the glass liner to the base and with the liner ground to a feather edge, building up a patch of acid resisting cement, glazing the patch and finally covering the entire patch with a sheet of gold leaf. The gold leaf is cemented in place by applying it over a layer of glaze which is still in a sticky condition.

The procedure of accomplishing the objects of this invention will be explained in more detail with reference to the drawing, in which:

Figure 1 illustrates schematically a fragmentary cross sectional view of a glass-lined wall of a reactor at different stages, A, B, C, and D, in the repair of a damaged area with a gold inlay;

Figure 2 illustrates schematically a fragmentary cross sectional view of a glass-lined wall of a reactor at different stages, A, B, D, C, and E, in the repair of a damaged area with ceramic cement and gold leaf;

Figure 3 is a cross-sectional view of a damaged glass-coated baffle.

Figure 4 illustrates schematically fragmentary cross sectional views of a glass-coated wall of a piece of equipment at different stages, A, B, C, and D, in the repair of a damaged portion with gold patch where the hole is clear through the metal as in the damaged baffle shown in Figure 3.

Figures 5, 6, 7, 8, and 9, illustrate fragmentary cross sectional views of glass coated equipment with alternative forms of repair or reconstruction.

Referring to Figure 1, the following example explains the technique employed in mending a damaged glass lining with a gold inlay where the hole is of the order of about two inches in diameter:

*Example 1*

With the glass 1 chipped away and the metal base 2 exposed as shown in Figure 1, view A, prepare a cavity in the damaged area 3 as follows:

With a ball point drill start to prepare the place in such a manner that the edges 4 of the cavity will be square to the glass surface 5, as shown in Figure 1, view B, so that a metal coin like a silver dollar could be plugged in tight with its top surface flush with the glass surface. The cavity may be of any shape; round, oval, or square, depending on the damaged area.

Next, using an inverted cone drill, undercut all around the edges of the cavity to form a groove 6 in the metal 2 under the glass so that when the gold is packed in it will be fixed immovably like a rivet in the metal base. When undercutting, be sure to press the drill slightly toward the bottom, not toward the top, as it might chip the glass. If the damaged area is more than ½ inch in diameter, make a groove 7 across the bottom of the cavity 3 and undercut the grove 7 into the metal 2 so that a projecting tongue of the gold will be held to the bottom also as shown in Figure 1, view B. If the patch is still larger, it is desirable to make criss-cross grooves, undercutting them also.

After the cavity is thus prepared, it may be cleaned with acetone or alcohol. It should be clean and dry before inserting the filling. Proceed by packing the gold foil in the form of rolls or cylinders, about 1 cm. in diameter and 1 to 2 cm. in length, first in the grooves 7 at the bottom and then in the grooves 6 around the edges. Due to the cohesive nature of the gold as in the form of annealed gold foil, the gold will be built up into a solid homogeneous mass 8 as it is packed tightly. The gold is packed into the cavity until it reaches about ⅛ inch of thickness above the glass surface as shown in Figure 1, view C. In packing the gold, it is desirable to compact firmly one gold cylinder at a time. To fill all voids in packing, a mallet or flat end of a dental plugging tool may be used with light tapping to avoid chipping of the glass. The building up of the patch to above the surface of the gold is important, for upon hammering, the gold is packed down to a substantial extent. The repair is finished by hammering the gold down until the gold is condensed into a solid homogenous mass reaching to all sides of the cavity, and finally the surface of the gold plug may be polished with a rubber wheel until a smooth surface even with the glass is obtained as shown in Figure 1, view D. The finished gold patch then has an inlay appearance, and the equipment is ready for service.

In using the gold, each cylinder should be dry, and it is recommended that the gold cylinders be heated for the purpose of driving out the moisture for better cohesion by spreading them out on a hot plate, then putting them into a glass container to be taken inside a reactor for application in filling the cavity.

Referring to Figure 2, instructions for repairing a large damaged area shown in Figure 2, view A are given in the following example:

Example II

Proceed by grinding off the glass 1 surrounding the hole 3 to a bevel with a feather edge to form a cavity having a concave appearance, as shown in Figure 2, view B, the cavity appearing as in Figure 2, view A before any repairs.

Clean the surface and apply a ceramic filler of a type commercially available for repairing glass-lined equipment such as Pfaudler AFT filler, if the metal is exposed. Dry the filler and apply a glass-lined equipment repair cement, then dry the cement, acid treat, and further dry the cement 9. In applying the cement it should be thoroughly mixed and not be disturbed after application. It is preferred to apply several thin coats or layers of thin cement rather than one heavy coat and it, of course, will be readily understood that the overlapping layers may be applied at such brief intervals that they will coalesce into a single mass which becomes a rigid insert as the cement sets in the cavity. The cement patch 9 as shown in Figure 2, view C, may be thoroughly dried with an electric heater or an infra-red lamp. For the acid treatment, an aqueous solution of acid (1:1) may be brushed on for six minutes and then washed off with water. It is advantageous to repeat the acid treatment twice.

Following the final drying of the acid treated cement, coats of cover glaze 10 are applied with drying for about fifteen minutes between each coat of glaze until about six coats have been applied. After a final setting for several hours, the cement patch, as shown in Figure 2, view D, is ready for gold leaf application.

To the cement patch is applied a thin coat of cover glaze again, and while it is still sticky, it is covered with gold leaf, such as comes in book form for use in gold lettering by window sign painters.

Several thicknesses of gold leaf, preferably two or three leaves together, are applied and dried for about thirty minutes and the operation is repeated about three times until a heavy coating of gold leafing is built up. After the desired thickness of gold leaf 8 is built up, it may be again covered with glaze and dried thoroughly for twenty-five hours after which the repaired equipment appearing as shown in Figure 2, view D, is ready for service.

It is to be understood that the types of filler cement and cover glaze which may be used in the repair of glass lined apparatus include commercially available products used in making ceramic patches and others known to those skilled in the art. Some typical acid resistant cements are formulated of finely ground silica or ground asbestos in a thick paste with silicate of soda. The paste may be made up with water or have a binder such as linseed oil or tar incorporated. Generally after the cement is applied, it is heated and then painted with acid resistant cover glaze which are especially resistant to abrasion and chemical action. An example of such a glaze is a sodium silicate mixed with water.

Referring to Figure 3, the procedure for making a gold patch where holes are through the metal, is set forth in the following example:

Example III

If a glass lined or coated equipment such as an agitator or baffle fails due to a fracture through the glass and a hole corroded through the metal base, as shown in Figure 3 and the enlarged fragmentary view A of Figure 4, it is repaired as follows:

Prepare the hole in the same way as explained in Example 1, i. e., grind the edges of the glass square to the glass surface and undercut around the metal, as shown in Figure 4, view B, then plug the bottom of the hole very tightly with a short piece of lead having the lead 11 extend about ½ inch above the bottom of the metal base; and spread the lead lightly with a blunt chisel or nail until the lead partly fills the hole and is riveted to one of the undercut grooves 6 as illustrated in Figure 4, view C. With a flat bottom surface, groove the top of the lead to form a dovetail mortise 6 and finish the repair with a gold inlay 8 following the instructions given in Example 1. The lead plug 11 acts as a false bottom, and by partly building up the hole with lead, the more precious gold metal is conserved. A damaged agitater thus repaired, which would have been otherwise completely discarded has been kept in service for a period of over six months and was still in perfect condition, as dependable as a new agitator.

In repairing the equipment with a hole through the metal, using the same procedure described in Example 3, a cement may be used instead of the lead for forming the false bottom. A suitable cement is known as "Smooth On" Cement No. 1 which upon drying forms a metal-like bottom. A preferred cement is one which has suitable hardness, durability adhesion to the metal, and the property of expanding after drying.

In obtaining a good square edge on the glass surrounding a cavity, a grinding stone called a "mounted dentstone" obtained at dental supply places, may be used. In working with dentstones, it is recommended that the work be done under water, i. e., with water as a lubricant to prevent over-heating.

In adition to the illustrated methods of firmly anchoring the gold plug it is to be understood that other variations may be made in undercutting the glass lining, the metal base, or the false bottom material. Variations may be made in the selection of the cementing materials. In some instances it may be desired to employ brazing alloys for bonding the gold plug to a base metal.

Although preferred forms of repair have been illustrated with respect to Figures 1, 2, and 4, there are instances in which it may be desired to have the plug or filling construction modified. In Figure 5, a gold leaf filling is made as described in Example 2 but the gold leaf is recessed in a retentive cavity in the glass lining. In Figure 6 the gold inlay 8 is shown attached to the metal base 2, e. g., by cementing, soldering or brazing. In Figure 7 a relatively thin gold inlay 8 is attached to a lead plug false bottom 11. In Figure 8 the gold inlay 8 is anchored in a cement false bottom 9. In Figure 9 is illustrated an apertured gold plug 8 fixed in the metal base by a threaded socket plug 12 with a tubular conduit 13 passed through the aperture, a gland-type fitting or adapter 14 with a chamfered thread screwed into socket plug 12 tightly compacting an acid resistant packing 15 around the tubular conduit 13. In this connection, the gold firmly surrounds a glass transfer tube 13 cover glaze may be applied over the gold, and with a gold foil packing 15, a leak proof and acid-resistant fitting is made. The socket plug 12 and adapter 14 may be made of common metal like the base metal.

It is to be understood that still further modifications come within the spirit and scope of this invention.

I claim:

In the art of building up a gold covered plug in a cavity in the vitreous glass liner of defective chemical equipment comprising an iron metal base and a vitreous glass liner having a cavity extending therethrough to an uncovered portion of said base and consisting of a ceramic material fused on said base selected from the group of materials consisting of porcelain and enamel, said plug consisting of a patch and a gold leaf covering and bonded to said patch, said patch being extended from said uncovered portion to the level of the outer surface of said liner and being made of successive layers of acid resisting cement and sodium silicate glaze, said cement consisting of an admixture of said glaze and a finely ground mineral selected from the group consisting of silica and asbestos; said process consisting essentially of grinding down the liner adjacent said cavity to a feather edge at said uncovered portion, applying within said cavity successive thin layers of said cement in the form of a stiff paste until a patch completely fills said cavity, drying said patch, coating said patch with at least one layer of a sticky glaze of sodium silicate mixed with water, drying said glaze, applying another layer of said sticky glaze and while said sticky glaze is still wet, sticking a gold leaf covering on and completely over said patch in a manner adapted to chemically shield said patch and said uncovered portion from corrosive substances.

References Cited in the file of this patent

UNITED STATES PATENTS

| | | |
|---|---|---|
| 1,397,167 | Hopper | Nov. 15, 1921 |
| 1,947,493 | Rose et al. | Feb. 20, 1934 |
| 2,157,456 | Koyemann | May 9, 1939 |
| 2,229,526 | Schabacker | Jan. 21, 1941 |
| 2,265,352 | Corbin | Dec. 9, 1941 |
| 2,355,174 | Shepard | Aug. 8, 1944 |
| 2,463,561 | Riley | Mar. 8, 1949 |

FOREIGN PATENTS

| | | |
|---|---|---|
| 558,410 | Great Britain | Jan. 4, 1944 |

OTHER REFERENCES

Page 503, Harris on Dentistry, 11th edition, published by Blackiston, Philadelphia, Pa., 1885. Copy in Division 14.